Figure 1:
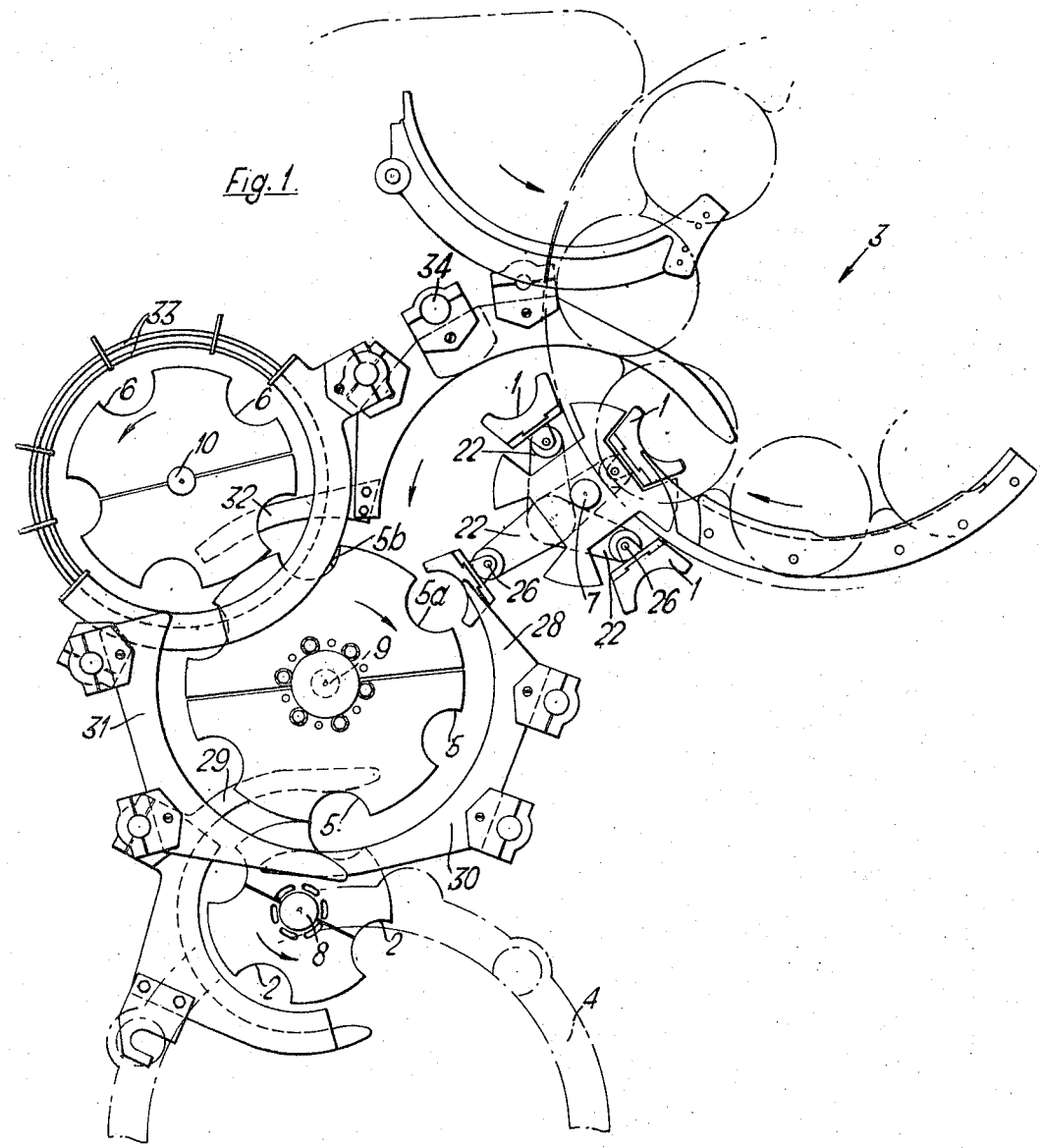

Feb. 28, 1967  M. H. C. BUTTERY  3,306,421
ARTICLE FEEDING APPARATUS
Filed Dec. 22, 1964  6 Sheets-Sheet 1

Inventor
MICHAEL HARCOURT CHRISTIANS BUTTERY
By
Mason, Porter, Diller & Stewart
Attorneys

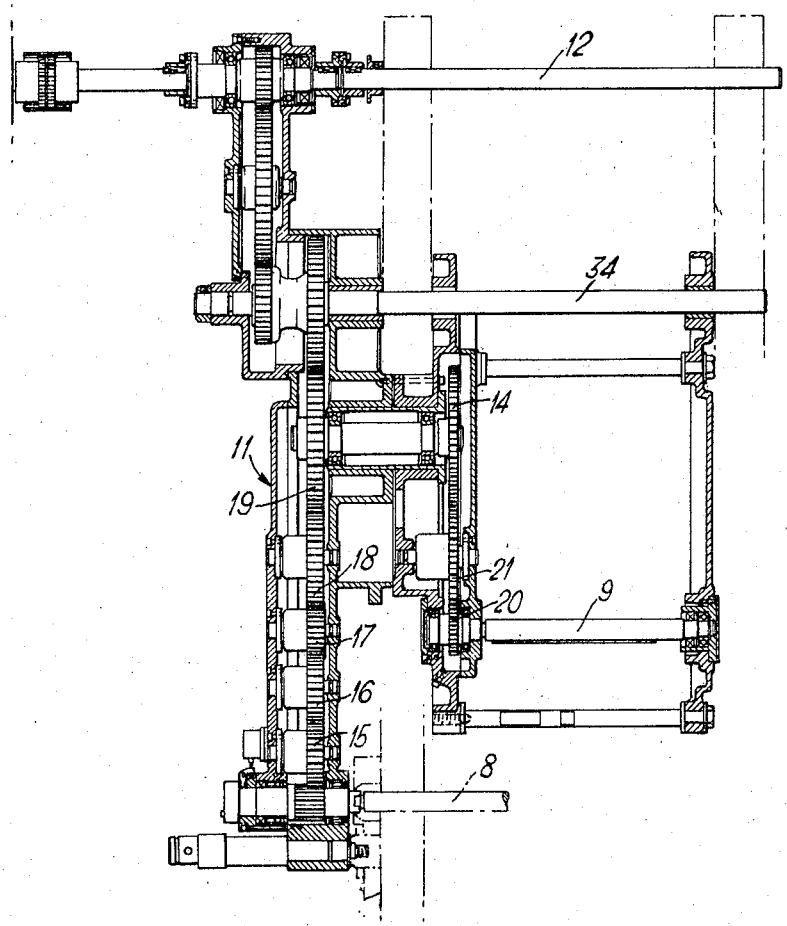

Feb. 28, 1967  M. H. C. BUTTERY  3,306,421
ARTICLE FEEDING APPARATUS
Filed Dec. 22, 1964  6 Sheets-Sheet 4
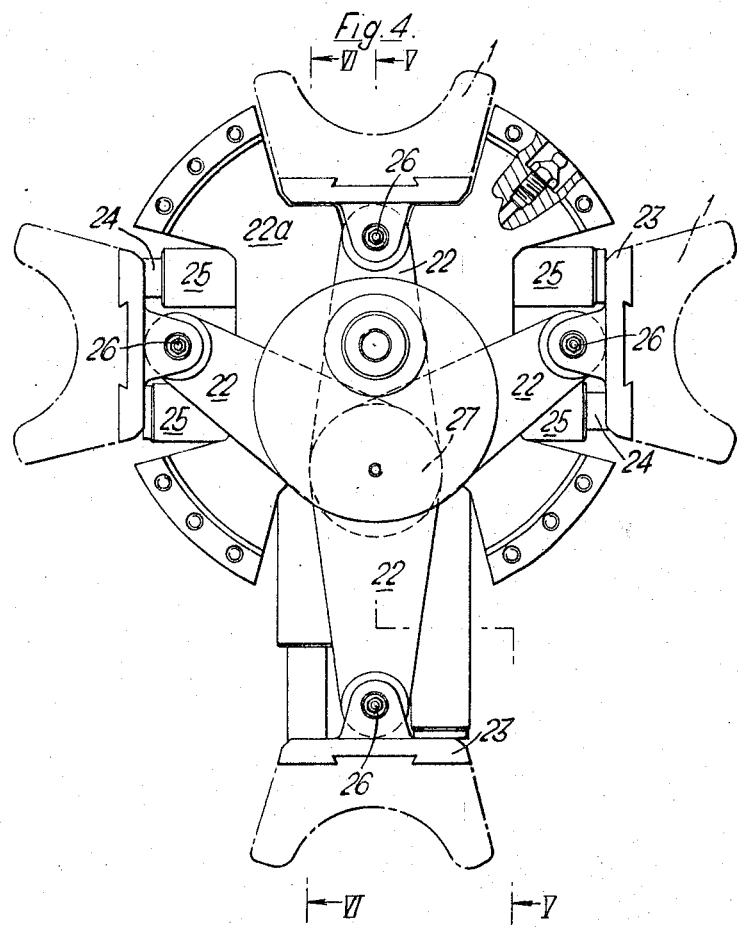
Inventor
MICHAEL HARCOURT CHRISTIANS BUTTERY
By
Mason, Porter, Diller & Stewart
Attorneys

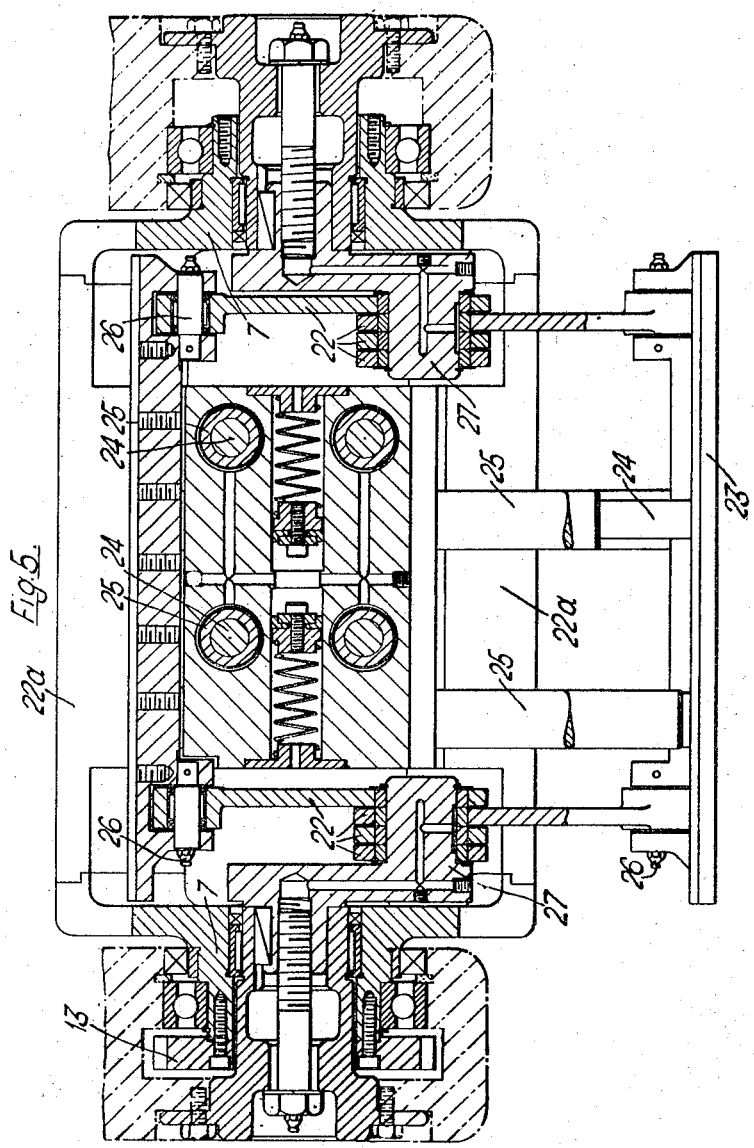

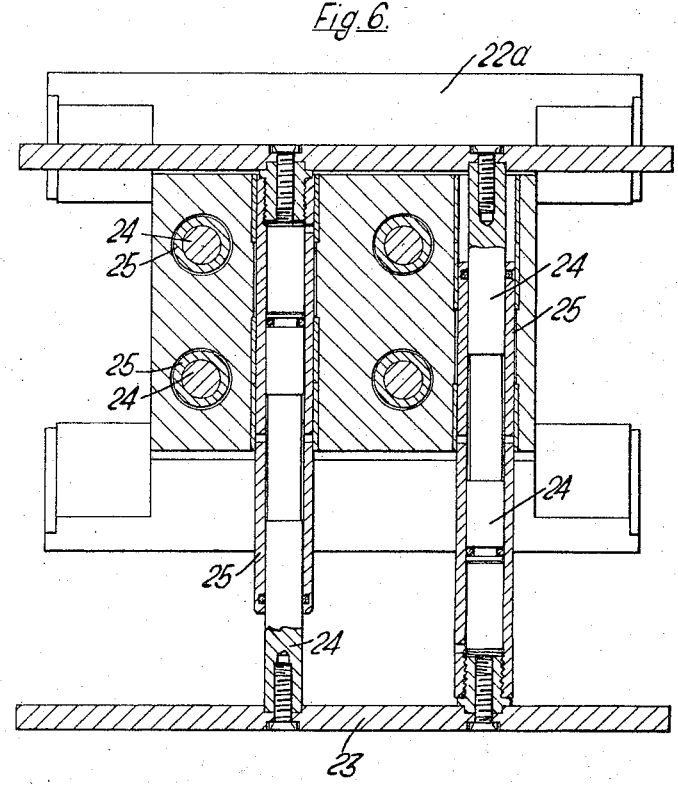

United States Patent Office 3,306,421
Patented Feb. 28, 1967

3,306,421
ARTICLE FEEDING APPARATUS
Michael Harcourt Christians Buttery, Bushey Heath, England, assignor to The Metal Box Company Limited, London, England, a British company
Filed Dec. 22, 1964, Ser. No. 420,330
Claims priority, application Great Britain, Jan. 7, 1964, 761/64
9 Claims. (Cl. 198—25)

This invention relates to article feeding apparatus and in particular to apparatus for feeding articles from one machine to another.

In certain manufacturing processes it is sometimes desirable to make articles double the length required and then separate the double length article into two articles of the desired length. Separation of the bodies is effected in a machine known as a parting machine and the articles are then transported to a further machine for further processing. For example in the manufacture of can bodies, the parting machine may be succeeded by a flanging machine into which the bodies are fed one at a time to have flanges formed at the ends thereof in preparation for can ends to be seamed thereto.

It is a main object of the invention to provide a feeding apparatus which can link one machine with another machine in a manner such that without interrupting the operation of the machines articles which are delievered in random order from the one machine can be fed one at a time to the other machine. The apparatus can be used whenever it is desired to deliever articles in pairs and in end-to-end relation in a direction transverse to the axis thereof and to feed the articles one at a time to a further machine.

According to the invention there is provided feeding apparatus for articles comprising a first series of pockets movable in rotation and each arranged to receive at least two articles in end-to-end relation and to move them in a direction transverse to the axis thereof, a second series of pockets movable in rotation and in timed relation with the pockets of the first series and each arranged to receive one article only, and an article separating device interposed between said first and second series of pockets and operable to separate the articles delivered from a pocket of said first series and to deliver them one at a time to pockets of the second series for movement thereby in a direction transverse to the axes of the articles.

The article separating device may comprise at least one additional series of pockets and means co-operating with said additional series of pockets to effect axial displacement of each article other than one prior to delivery thereof to a pocket of the second series, the arrangement being such that when the number of pockets of the first series is an even number that of said additional series is an odd number, and when the number of pockets of the first series is an odd number that of said additional series is an even number.

The pockets of the first series may be movable with pocket supports mounted for rotation with a rotatable carrier and for movement relative to the carrier in a direction radial to the axis of rotation thereof, the apparatus including actuating means co-operating with the pocket supports to effect radial movement thereof in a manner such that following delivery of articles to a pocket the circumferential velocity of the pocket is increased to that of the pockets of the second series and the articles carried by said pocket are delivered to the separating device while the pocket is moving at said increased circumferential velocity. Each pocket support may be rotatable about fixed crank pins eccentric to the axis of rotation of the carrier.

Each pocket of the first series may be formed by a magnetic shoe and the apparatus include stationary stripper elements located in the path of articles carried by the shoes to remove articles therefrom for delivery to the separating device.

The separator device may comprise a third and fourth series of pockets rotatable with the same circumferential velocity as that of the pockets of the second series, said third series of pockets comprising a number of pockets greater than the number of pockets of the first series whereby alternate pockets of the third series receives articles from pockets of the first series, and said fourth series of pockets comprises a number of pockets which is an odd number if the number of pockets of the first and third series is an even number, and is an even number if the number of pockets of the first and third series is an odd number whereby an article carried by a pocket of the fourth series is delivered therefrom to a pocket of the third series succeeding a pocket of the third series which is to receive a pair of articles from a pocket of the first series, stationary stripper elements operable to remove one article of a pair from a pocket of the third series and to deliver it to a pocket of the second series while permitting movement of the second article of the pair to a position at which the second article is moved into a pocket of the fourth series, article displacing means co-operating with the pockets of the fourth series axially to move articles carried thereby to positions at which they can be deposited in pockets of the third series for delivery thereby to pockets of the second series, and stationary stripper elements operable to remove articles from pockets of the fourth series and to deliver them to pockets of the third series.

The article displacing means may comprise rod-like elements disposed helically around the path of the pockets of the fourth series to engage an end of an article and to effect said axial movement thereof during rotation of the pockets.

The first series and second series may each consist of four pockets, the third series consist of six pockets, and the fourth series consist of five pockets.

Figure 2:
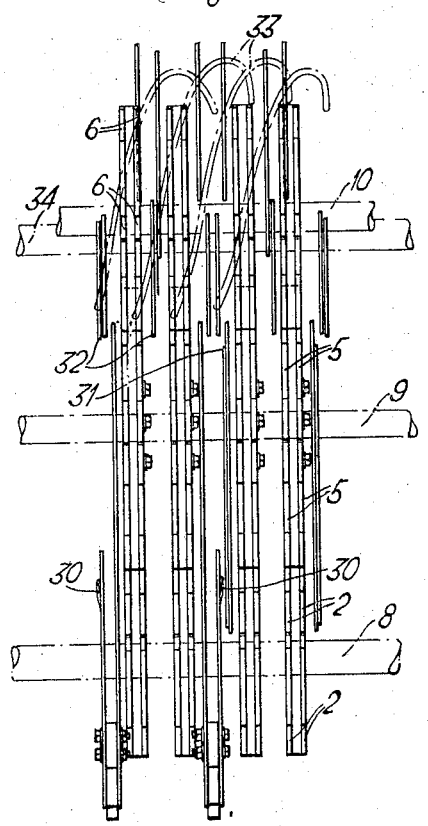

In order that the invention may be clearly understood one embodiment thereof will now be described, by way of example, with reference to the accompanying drawings, in which:

FIGURE 1 is a diagrammatic side elevation of apparatus according to the invention, FIGURE 2 is an end view of some parts of the apparatus of FIGURE 1, FIGURE 3 is a section through the gear box which drives the apparatus, FIGURE 4 is an end elevation, with some parts removed for clarity, of the first series of pockets embodied in the apparatus, FIGURE 5 is a section on line V—V, FIGURE 4, and FIGURE 6 is a section on line VI—VI, FIGURE 4.

Referring to the drawings, the apparatus comprises a first series of pockets 1, FIGURES 1 and 4, movable in rotation and each arranged to receive two articles in end-to-end relation and to move them in a direction transverse to the axis thereof, a second series of pockets 2 movable in rotation and in timed relation with the pockets 1 of the first series and each arranged to receive one article only, and an article separating device, described below, interposed between the first and second series of pockets and operable to separate the articles of a pair delivered from them one at a time to pockets 2 of the second series for movement thereby in a direction transverse to the axes of the articles.

The apparatus being described is arranged to effect the feeding of can bodies which are delivered to the pockets 1 in pairs, the bodies being in end-to-end relation and fed sideways, that is transverse to the axes thereof from a parting machine 3, indicated in broken lines in FIGURE 1 and which because it is of known kind is not described herein. The bodies delivered one at a time by the pockets 2 are fed thereby to a flanging machine 4, FIGURE 1, also indicated in broken lines and not described herein because it is of known kind.

The separating device comprises a third series of pockets 5 and a fourth series of pockets 6 rotatable with the same circumferential velocity as that of the pockets 2 of the second series. The pockets 1, 2, 5, 6 of the first, second, third, and fourth series are rotated respectively with stub shafts 7, FIGURES 1 and 5, and shafts 8, 9, 10, FIGURES 1 and 2, all of which are driven by a gear box 11, FIGURE 3, through a drive shaft 12 for the parting machine 3. The stub shafts 7 are driven by a gear wheel 13, FIGURE 5, and gear wheel 14, FIGURE 3, through an intermediate gear wheel, not shown; shaft 8 is driven by a train of gear wheels 15 to 18 from a gear wheel 19 rotatable with the gear wheel 14; and shaft 9 is driven by a gear wheel 20, intermediate gear wheel 21 and gear wheel 14. Shaft 10 is driven by a gear wheel and an intermediate gear wheel, not shown, by gear wheel 14.

The number of pockets in each series is immaterial provided always that if the number of pockets in the first and third series is an even number then the number of pockets in the fourth series is an odd number, and if the number of pockets in the first and third series is an odd number then the number of pockets in the fourth series is an even number. As shown in FIGURE 1 the first and second series each consists of four pockets, the third series consists of six pockets, and the fourth series consists of five pockets.

When the bodies are made of ferrous metal the pockets 1 of the first series may each consist of a magnetic shoe and each pocket be movable with pocket supports 22, FIGURES 4 and 5, mounted for rotation with a carrier 23, the supports 22 being housed in a spider frame 22a to which the gear wheel 13, FIGURE 5, is connected. Each pocket is also connected with guide rods 24, FIGURES 4 to 6, slidable axially in a housing 25 carried by the carrier 23. The pocket supports 22 are pivoted at 26 to the pockets and are rotatable about fixed crank pins 27, FIGURE 5, eccentric to the axis of rotation of the carrier 23, so that as the carrier rotates the pockets are movable relative to the carrier in a directional radial to the axis of rotation of the carrier. The arrangement is such that following delivery of a pair of bodies to a pocket 1 from the parting machine 3 the circumferential velocity of the pocket is increased to that of the pockets of the second series, and to that of the pockets of the third and fourth series, so that when the bodies are delivered to a pocket of the third series the pocket 1 has a circumferential velocity equal to that of the pocket 5 of the third series to which the bodies are transferred. The transfer or delivery of the bodies from a pocket 1 to a pocket 5 is effected by stationary stripper elements 28, FIGURE 1 and if the bodies are made of ferrous metal the pockets 5 are magnetic.

As a pair of bodies carried by a pocket 5a, FIGURE 1, of the third series is aligned with a pocket 2 of the second series stationary stripper elements 29, FIGURE 1, cause one body to be delivered to the pocket 2. The other body of the pair continues to be carried by the pocket 5a until that pocket is aligned with a pocket 6 of the fourth series. When a body is presented by a pocket 5a to a pocket 6 the body is stripped out of pocket 5a and into pocket 6. Stationary guides 30, 31 retain the bodies in pocket 5a until they are delivered respectively to a pocket 2 and a pocket 6.

Body displacing means co-operate with the pockets 6 of the fourth series to move a body carried by a pocket 6 axially to a position at which it can be delivered to a pocket 5b, FIGURE 1, of the third series for delivery thereby to a pocket 2 of the second series. Stationary stripper elements 32 operate to remove a body from a pocket 6 for delivery into a pocket 5b.

The means for effecting axial displacement of a body relative to a pocket 6 may be of any desired kind but as shown in the drawings consists of stationary rod-like elements 33 disposed helically around the path of the pockets 6 to engage an end of a body and to effect axial movement thereof during rotation of the pockets.

During operation of the apparatus each pocket 1 receives a pair of bodies and rotates through 180° to a position at which the pocket 1 is aligned with a pocket 5a and the stripper elements 28 cause the bodies to enter the pocket 5a. The next succeeding pocket 5b does not receive a pair of bodies from a pocket 1. When the pocket 5a with the pair of bodies therein is aligned with a pocket 2 one of the bodies is moved out of pocket 5a and into the pocket 2 for delivery thereby to the flanging machine 4. The other body in pocket 5a is carried on thereby until the pocket is aligned with a pocket 6 when the body is moved from pocket 5a into pocket 6. During rotation of the pocket 6 with the body the latter is engaged by the rod-like elements 33 and is moved axially thereby to a position at which when it is returned to a pocket 5b it will be positioned in the pocket 5b for delivery thereby to a pocket 2. The re-positioned body is stripped from the pocket 6 by the stripper elements 32 and is deposited in a pocket 5b which did not contain a pair of bodies at the time of passing the position of delivery of a body from pocket 5a to a pocket 2.

The gear box 11 is pivoted on a fixed rod 34, FIGURES 1, 2 and 3 to permit movement thereof and of the parts driven thereby relative to the pockets of the parting machine 3 should it be desired to obtain access thereto.

In the foregoing description the pockets 1 and 5 are described as being magnetic. If, however, the articles are not made of ferrous metal the pockets 1 and 5 can be arranged mechanically or pneumatically to effect transfer of the articles.

Further, the foregoing description describes the apparatus as constructed to deal with articles fed in pairs to the pockets 1. If desired, however, the apparatus can be modified to permit a greater number of articles to be fed to a pocket 1 and to be transferred one at a time to a pocket. For example, if three articles are fed in line to a pocket 1 they are delivered, at the correct velocity to each third pocket 5 of the third series. One article will be delivered from the pocket 5 to a pocket 2 and the other articles are moved one to a pocket of each of two further series of pockets, being respectively a fourth and a fifth series. In the pockets of the fourth and fifth series the articles are respectively displaced axially by one and two pitch distances and are delivered one into each of two pockets 5 for transfer thereby to pockets 2 of the second series.

In an alternative embodiment of the apparatus the number of pockets 1 of the first series may be an even number and the number of pockets 5 of the third series may be an odd number or vice versa. The helical guide elements 33 are provided to co-operate with the pockets 5 and there is no fourth series of pockets.

If desired, the helical guide elements may be replaced by cams and push rods or chains running parallel to the axis of the cam, or by a Z-crank linkage mechanism.

I claim:
1. Feeding apparatus for articles comprising a first series of pockets movable in rotation and each arranged to receive at least two articles in end-to-end relation and to move them in a direction transverse to the axis thereof, a second series of pockets movable in rotation and in timed relation with the pockets of the first series and each arranged to receive one article only, and an article separating device interposed between said first and second series of pockets and operable to separate the articles delivered from a pocket of said first series and to deliver them one at a time to pockets of the second series for movement thereby in a direction transverse to the axes of the articles, said pockets of the first series being movable with pocket supports mounted for rotation with a rotatable carrier and for movement relative to the carrier in a direction radial to the axis of rotation thereof, and including actuating means cooperating with the pocket supports to effect radial movement thereof in a manner such that following delivery of articles to a pocket the circumferential velocity of the pocket is increased to that of the pockets of the second series and the articles carried by said pocket are delivered to the separating device while the pocket is moving at said increased circumferential velocity.

2. Apparatus according to claim 1 wherein each pocket of the first series is formed by a magnetic shoe, and including stationary stripper elements located in the path of articles carried by the shoes to remove articles therefrom for delivery to the separating device.

3. Apparatus according to claim 1 wherein each pocket support is rotatable about fixed crank pins eccentric to the axis of rotation of the carrier.

4. Apparatus according to claim 3, wherein each pocket of the first series is formed by a magnetic shoe, and including stationary stripper elements located in the path of articles carried by the shoes to remove articles therefrom for delivery to the separating device.

5. Feeding apparatus for articles comprising a first series of pockets movable in rotation and each arranged to receive at least two articles in end-to-end relation and to move them in a direction transverse to the axis thereof, a second series of pockets movable in rotation and in timed relation with the pockets of the first series and each arranged to receive one article only, and an article separating device interposed between said first and second series of pockets and operable to separate the articles delivered from a pocket of said first series and to deliver them one at a time to pockets of the second series for movement thereby in a direction transverse to the axes of the articles, said article separating device comprising at least one additional series of pockets and means cooperating with said additional series of pockets to effect axial displacement of each article other than one prior to delivery thereof to a pocket of the second series, the arrangement being such that when the number of pockets of the first series is an even number that of said additional series is an odd number and when the number of pockets of the first series is an odd number that of said additional series is an even number, said separator device comprising a third and a fourth series of pockets rotatable with the same circumferential velocity as that of the pockets of the second series, said third series of pockets comprising a number of pockets greater than the number of pockets in the first series whereby alternate pockets of the third series receive articles from pockets of the first series, and said fourth series of pockets comprises a number of pockets which is an odd number if the number of pockets of the first and third series is an even number, and is an even number if the number of pockets of the first and third series is an odd number whereby an article carried by a pocket of the fourth series is delivered therefrom to a pocket of the third series succeeding a pocket of the third series which is to receive a pair of articles from a pocket of the first series, stationary stripper elements operable to remove one article of a pair from a pocket of the third series and to deliver it to a pocket of the second series while permitting movement of the second article of the pair to a position at which the second article is moved into a pocket of the fourth series, article displacing means cooperating with the pockets of the fourth series axially to move articles carried thereby to positions at which they can be deposited in pockets of the third series for delivery thereby to pockets of the second series, and stationary stripper elements operable to remove articles from pockets of the fourth series and to deliver them to pockets of the third series.

6. Apparatus according to claim 5 wherein the first series and second series each consist of four pockets, the third series consists of six pockets, and the fourth series consists of five pockets.

7. Apparatus according to claim 5 wherein the article displacing means comprises rod-like elements disposed helically around the path of the pockets of the fourth series to engage an end of an article and to effect said axial movement thereof during rotation of the pockets.

8. Apparatus according to claim 7, wherein the first series and second series each consist of four pockets, the third series consists of six pockets, and the fourth series consist of five pockets.

9. Feeding apparatus for articles comprising a first series of pockets movable in rotation and each arranged to receive at least two articles in end-to-end relation and to move them in a direction transverse to the axis thereof, a second series of pockets movable in rotation and in timed relation with the pockets of the first series and each arranged to receive one article only, and an article separating device interposed between said first and second series of pockets and operable to separate the articles delivered from a pocket of said first series and to deliver them one at a time to pockets of the second series for movement thereby in a direction transverse to the axes of the articles, said article separating device comprising at least one additional series of pockets and means cooperating with said additional series of pockets to effect axial displacement of each article other than one prior to delivery thereof to a pocket of the second series, the arrangement being such that when the number of pockets of the first series is an even number that of said additional series is an odd number and when the number of pockets of the first series is an odd number that of said additional series is an even number, said pockets of the first series being movable with pocket supports mounted for rotation with a rotatable carrier and for movement relative to the carrier in a direction radial to the axis of rotation thereof, and including actuating means cooperating with the pocket supports to effect radial movement thereof in a manner such that following delivery of articles to a pocket the circumferential velocity of the pocket is increased to that of the pockets of the second series and the articles carried by said pocket are delivered to the separating device while the pocket is moving at said increased circumferential velocity.

References Cited by the Examiner

UNITED STATES PATENTS

| | | | |
|---|---|---|---|
| 2,919,801 | 1/1960 | Pechy | 198—41 |
| 3,164,243 | 4/1965 | Rudszinet et al. | 198—32 |

FOREIGN PATENTS

| | | |
|---|---|---|
| 703,907 | 2/1965 | Canada. |
| 665,506 | 1/1952 | Great Britain. |

EVON C. BLUNK, *Primary Examiner.*

SAMUEL F. COLEMAN, *Examiner.*

R. M. WALKER, M. L. AJEMAN,
*Assistant Examiners.*